UNITED STATES PATENT OFFICE 2,643,202

METHOD OF MAKING NONBLOCKING FILM OF RUBBER HYDROCHLORIDE

Drury R. Burton, Uniontown, and Harry W. Wilson, Cuyahoga Falls, Ohio, assignors to Wingfoot Corporation, Akron, Ohio, a corporation of Delaware No Drawing. Application August 1, 1950, Serial No. 177,138

2 Claims. (Cl. 117—139)

This invention relates to a method of preventing blocking in heat tackifiable film, particularly rubber hydrochloride film, and to packages and pouches prepared therefrom.

The term "blocking," as universally used in the film conversion field, means adherence of one film surface to another. This may be caused by the surface condition of the film or by a static charge on the film surface. The American Society for Testing Materials defines the block point as the minimum temperature required to develop adhesion between two surfaces of material under specified conditions of time and pressure.

Rubber hydrochloride film used for packaging is generally manufactured in sheet form and incorporated into rolls for use or sale. There are many converters of such film who manufacture packages and pouches for preservation and display of many items. Blocking is an acute problem in the processing of the film and in the manufacture and storage of products made therefrom. Films are frequently sealed by means of an application of heat to the surfaces to be sealed. The seal is accomplished because the film is tackified when heat is applied. In order to prevent blocking, the seal must be kept from contacting any other film surface until the tackified portion has had an opportunity to recrystallize. This may be accomplished by extended exposure to the atmosphere or by means of a mechanical separation. Artificial cooling will not accomplish the same result because the crystals will freeze and will regroup only when allowed sufficient time.

In the past it has been the practice to prevent blocking by (1) the use of paper slip sheets, (2) separation of the films by water, (3) separation by means of a viscous liquid, or (4) separation by finely divided solids. All of these methods have proven unsatisfactory in the merchandising of food products and other products where customer appeal is essential. The use of paper slip sheets adds considerably to the time necessary to prepare the packages and must be removed prior to being displayed. The use of water creates a clouded film through the trapping of water on the surface. The surface of a film is made oily to the touch when sufficient uncompounded viscous liquid is used to eliminate blocking. The use of finely divided solids leaves the film specked.

It is an object of our invention to provide a tasteless, non-odorous transparent dispersion to be used to prevent blocking of rubber hydrochloride film.

Another object of our invention is to provide a cheap non-volatile viscous material for use in the packaging industry whereby a minute amount will prevent blocking without destroying transparency.

It is a further object of our invention to provide a non-blocking rubber hydrochloride pouch or package, particularly a transparent, non-discolored pouch or package for use in the food packaging industry.

Other objects and advantages of our invention will be apparent, and still others will appear in the following description.

In practicing our invention, the anti-blocking dispersion can be prepared by mixing a finely divided pulverulent material in a viscous liquid and then applying the same to the film surface.

We can prepare a non-blocking pouch or package by mixing a dispersion of finely divided pulverulent material such as sulphur, talc, corn starch, silica, magnesium carbonate, or carbon black with a viscous liquid such as mineral oil, oleic acid, corn oil, soya oil, peanut oil, whale oil, or other animal or mineral oil, in a ball mill or in a high speed stirrer, and then coating the surface of the heat seal with the dispersion.

The percentages of solids and oils may vary substantially. The ratio of solids to oils depends on the particle size of the solids. Generally, the larger the particle size, the greater the amount of dispersion necessary to prevent blocking. Any particle size may be used up to the point of destroying transparency.

Preferably, the percentage of solids to liquids will range between twenty-five per cent solids and seventy-five per cent liquids, and two and one-half per cent solids to ninety-seven and one-half per cent liquids.

It is a preferred embodiment of our invention to prepare a dispersion of sulphur and magnesium carbonate in mineral oil in the approximate relation of one part by weight of sulphur and magnesium carbonate to eight parts by weight of mineral oil.

A thin coating of the dispersion can be applied to a surface of film such as a rubber hydrochloride film, for example, by means of a foamed latex sponge rubber pad or roller, or other type of absorptive pad or roller. Any amount of dispersion may be used up to an amount which would destroy transparency and any excess may be wiped off. Preferably about one cubic centimeter of dispersion can be used to treat about four thousand to eight thousand square inches of film.

In practicing our invention we can add our dispersion to the sheet of film prior to processing, during the processing steps, or directly to the seal upon completion of the product. We have found it preferable to apply the dispersion subsequent to heat sealing because of a tendency to press the pulverulent material into the film during sealing and thus to slightly cloud the final product. Addition of our dispersion to unprocessed film does not destroy the heat tackifiable characteristics of the film.

In the following examples of our invention, packages were prepared by heat sealing rubber hydrochloride film. A thin coating of dispersion was added to five square inches of seal and film surface by means of a foamed latex, sponge rubber pad. These packages were allowed to remain in direct contact for twenty-four hours. If they were easily separated at the end of that time, the test was considered to be successful. The percentage and parts shown in the following test dispersions are percentages and parts by weight:

*Example 1*

10 per cent sulphur and 90 per cent oleic acid.

*Example 2*

10 per cent sulphur, 90 per cent polyethylene glycol mono-oleate, having a molecular weight of about 400.

*Example 3*

10 per cent sulphur and 90 per cent corn oil.

*Example 4*

12.5 per cent sulphur (containing 2.5 per cent magnesium carbonate) and 87.5 per cent mineral oil.

*Example 5*

10 per cent talc and 90 per cent mineral oil.

*Example 6*

12.5 per cent corn starch and 87.5 per cent mineral oil.

*Example 7*

1.2 parts silica and 50 parts mineral oil.

*Example 8*

1 part magnesium carbonate and 30 parts mineral oil.

*Example 9*

1 part lamp black and 30 parts mineral oil.

All of the dispersions of Examples 1 through 9 gave satisfactory results and showed no tendency to adhere after being stacked for twenty-four hours. No noticeable discoloration appeared in any of the samples tested.

Because of the low cost of the materials involved, and because the components are edible but will have no tendency to become rancid, the preferred embodiment of our invention for use in the food packaging industry is the use of sulphur and magnesium carbonate dispersed in mineral oil, as illustrated by Example 4.

While certain representative embodiments and details have been shown for the purpose of illustrating the invention, it will be apparent to those skilled in this art that various changes and modifications may be made therein without departing from the spirit or scope of the invention.

We claim:

1. A method of preventing blocking of thermoplastic heat tackified rubber hydrochloride seal surfaces which comprises applying to said surfaces a dispersion of finely divided pulverulent sulphur in mineral oil.

2. A method of preventing blocking of a heat-tackified rubber hydrochloride seal which comprises applying to at least one surface of said seal a thin transparent coating of a dispersion comprising about one part by weight of pulverulent sulphur in about eight parts by weight of mineral oil.

DRURY R. BURTON.
HARRY W. WILSON.

References Cited in the file of this patent

UNITED STATES PATENTS

| Number | Name | Date |
|---|---|---|
| 1,352,163 | Wilson | Sept. 7, 1920 |
| 1,377,729 | Ray | May 10, 1921 |
| 1,516,598 | Griffith | Nov. 25, 1924 |
| 2,238,342 | Riehl | Apr. 15, 1941 |
| 2,340,774 | Snyder | Feb. 1, 1944 |
| 2,431,873 | Kennelly | Dec. 2, 1947 |
| 2,480,010 | Flett | Aug. 23, 1949 |
| 2,545,710 | Snyder | Mar. 20, 1951 |